(12) United States Patent
Mao et al.

(10) Patent No.: US 9,418,153 B2
(45) Date of Patent: Aug. 16, 2016

(54) VIDEO SEARCH AND PLAYBACK INTERFACE FOR VEHICLE MONITOR

(71) Applicant: Honeywell International Inc., Morristown, NJ (US)

(72) Inventors: Shulin Mao, Shanghai (CN); Mingshao Xue, Shanghai (CN); Liyun Wu, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 43 days.

(21) Appl. No.: 14/445,570

(22) Filed: Jul. 29, 2014

(65) Prior Publication Data

US 2016/0034477 A1   Feb. 4, 2016

(51) Int. Cl.
| | | |
|---|---|---|
| *H04N 7/18* | (2006.01) | |
| *G06F 17/30* | (2006.01) | |
| *G06K 9/00* | (2006.01) | |
| *H04N 9/87* | (2006.01) | |
| *G08B 13/196* | (2006.01) | |
| *G08G 1/017* | (2006.01) | |

(52) U.S. Cl.
CPC ........ *G06F 17/3082* (2013.01); *G06K 9/00758* (2013.01); *G06K 9/00771* (2013.01); *G08B 13/19645* (2013.01); *G08B 13/19656* (2013.01); *G08B 13/19673* (2013.01); *G08B 13/19682* (2013.01); *G08B 13/19693* (2013.01); *G08G 1/0175* (2013.01); *H04N 7/181* (2013.01); *H04N 9/87* (2013.01)

(58) Field of Classification Search
None
See application file for complete search history.

(56) References Cited

U.S. PATENT DOCUMENTS

| | | | |
|---|---|---|---|
| 2011/0193966 A1 | 8/2011 | Golan et al. | |
| 2011/0267460 A1* | 11/2011 | Wang | G06T 7/20 348/135 |
| 2015/0319352 A1* | 11/2015 | Donovan | G08B 13/19645 348/159 |

FOREIGN PATENT DOCUMENTS

| | | |
|---|---|---|
| EP | 1 578 130 A1 | 9/2005 |
| EP | 2 735 984 A1 | 5/2014 |

OTHER PUBLICATIONS

Yi-Ling, "Intelligent Urban Video Surveillance System for Automatic Vehicle Detection and Tracking in Clouds", 2013 IEEE 27th International Conference on Advanced Information and Networking and Applications, Mar. 25, 2013, pp. 814-821.*

(Continued)

*Primary Examiner* — Eileen Adams
(74) *Attorney, Agent, or Firm* — Husch Blackwell LLP

(57) ABSTRACT

A method and apparatus are provided, wherein the apparatus includes a plurality of video recordings in a database containing images of vehicles traveling within a predetermined geographic area and a list of license plates attached to each of those vehicles, a display that depicts a map of the geographic area, an input that receives an identifier of a license plate of a vehicle and a time period, and a processor that searches the plurality of video recordings for the license plate, returns a list of cameras capturing images of the identified license plate, sorts the returned list by time of capture, and displays a motion path of the vehicle on the map for the time period based upon the returned list. The method and apparatus may also include a uniform interface where the end-user can click the camera mark on the vehicle motion path to playback historic video recorded by this camera individually or click the whole motion path to playback a merged video which combines all recorded video from returned cameras into one display using only one window for the display of the merged video.

14 Claims, 4 Drawing Sheets

(56) References Cited

OTHER PUBLICATIONS

Yi-Ling Chen et al., Intelligent Urban Video Surveillance System for Automatic Vehicle Detection and Tracking in Clouds, 2013 IEEE 27th International Conference on Advanced Information Networking and Applications, Mar. 25, 2013, pp. 814-821.

Extended European search report for corresponding EP patent application 15176922.1, dated Dec. 16, 2015.

* cited by examiner

VIDEO SEARCH AND PLAYBACK INTERFACE FOR VEHICLE MONITOR

FIELD

This application relates to security systems and, more particularly, to surveillance systems.

BACKGROUND

Systems are known to protect people and assets within secured areas. Such systems are typically based upon the use of one more sensors that detect threats within the secured area.

Threats to people and assets may originate from any of a number of different sources. For example, an unauthorized intruder, such as a burglar, may present a threat to assets within a secured area. Alternatively, where a secured area includes roadways, a car that is being driven recklessly in violation of traffic regulations presents a different threat. Intruders or suspected criminals can also injure or kill people living within the area.

In many areas, such as airports, public buildings or roadways, it is impractical to automate the capture, detection and reporting of threats in real time. In these situations, one or more guards in a security center may monitor the secured area via a number of security cameras and other sensors located throughout the area. In many cases, a number of pan-tilt-zoom cameras are used to help guards and to allow a guard to scrutinize the secured area in more detail.

One or more of the cameras may record traffic on roadways adjacent or through the secured area. In order to detect impending threats, a process operating in the background (based upon use of a camera or security center) may detect license plates on passing cars and compare the license number with lists of license plates of known threats (e.g., terrorists).

While the detection of license plates is effective in detecting some situations, it is also useful to retrieve and search archival video for license plates of cars that are later involved in security breaches. This is useful in forensic studies intended to better understand the evolution of such breaches.

In support of this need, many systems record video of traffic for later review. If a need later arises for determining if a license plate was detected at some earlier time, a user may enter an identifier of a license plate and search the archive for the license plate. While this process is effective, a need exists for better methods of using such information.

DETAILED DESCRIPTION

Figure 1:
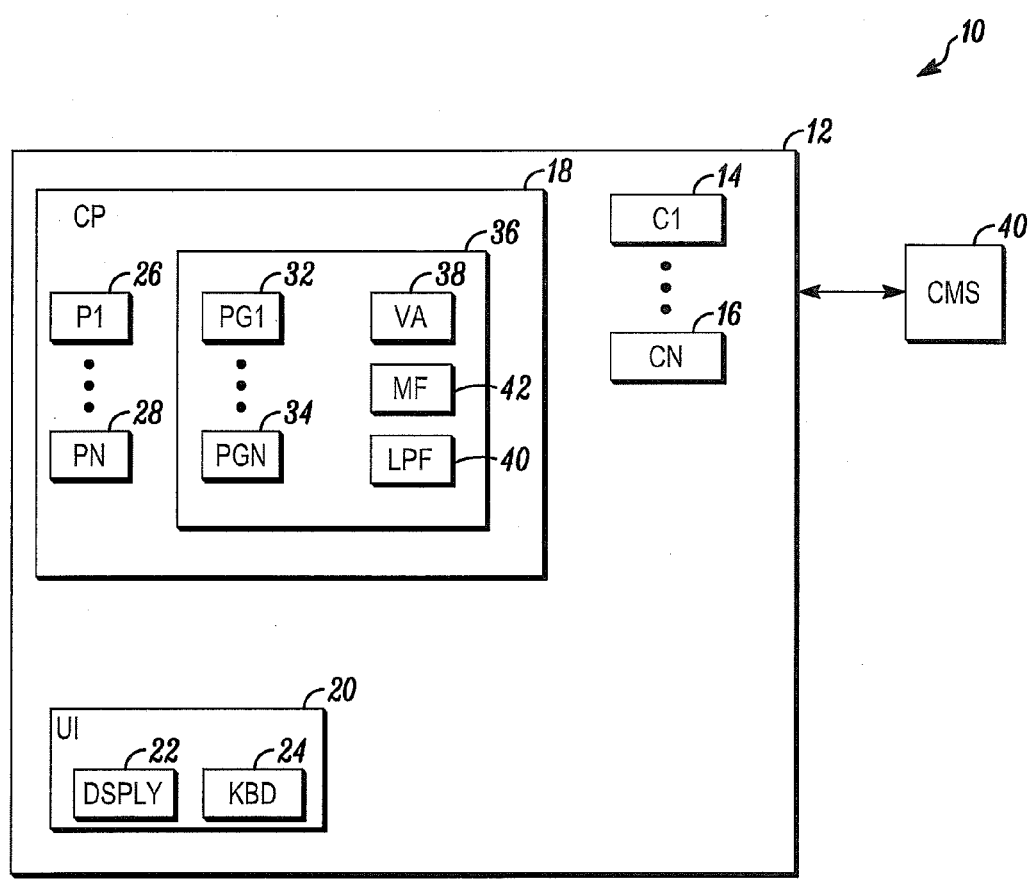
FIG. 1 illustrates a block diagram of a surveillance system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same, and is not intended to limit the application or claims to the specific embodiment illustrated.

FIG. 1 depicts a security and/or surveillance system 10 shown generally in accordance with an illustrated embodiment. Included within the system may be a number of surveillance cameras 14, 16 that detect threats within a secured area 12.

The security system may include a central server 18 and a user client (e.g., a user interface) 20. Geographically, the central server and/or client may be located within the secured area (as shown in FIG. 1) or located remotely. Logically, they are separated.

The client may be used by a human guard at a guard's station to monitor each of the cameras. In this regard, multi-channel video from the cameras may be shown on a display 22. Selection of the camera for the display of multi-channel video at the guard station may be accomplished via instructions entered through a keyboard 24 that is separate from the display or via a touchscreen display where the keyboard and display are combined.

The central server may monitor the cameras and sensors for threats. Upon detecting a threat, the control panel may send an alarm message to a central monitoring station 40. The central monitoring station may respond by summoning help (e.g., fire department, police, etc.).

Included within the central server may be one or more processor apparatus (processors) 26, 28, each operating under control of one or more computer programs 32, 34 loaded from a non-transitory computer readable medium (memory) 36. As used herein, reference to a step of a program is also reference to the processor that executed that step.

The central server may include at least one camera control processor or program that monitors the keyboard of the client for instructions from a user. Upon detecting an identifier of a camera, a video processor or program may collect video frames from one or more of the cameras and sequentially display the frames on the display of the user interface.

A video processor or program may also record video from each of the cameras into a video file 38. The video may be saved along with an identifier of the camera, a location of the camera and a time stamp associated with each frame indicating when the frame was captured.

The system may also include a processor or program that monitors cameras directed at nearby roads and/or parking lots for the identification of automobiles that enter and/or pass through those areas. In this regard, an image processor or program may analyze each frame of video to detect automobiles and the license plates on those automobiles.

A license plate processor or program may process the detected license plates to determine a license plate number from each detected license plate. The license plate numbers are saved in a license plate file 40, including the license plate, an identifier of the camera providing the video through which the license plate number was detected, and the time of detection.

Under one illustrated embodiment, the security system automatically correlates license detection with map location. For example, the security system may include a map file 42 including a map depicting the secured area along with the geographic coordinates of each of the cameras on the map. Upon detection of a particular license plate by one or more cameras, the path of travel of the associated automobile within the secured area may be determined and depicted on the map. The map may also be used as a graphical user interface (GUI) for playing back video associated with the license plate.

Figure 2:
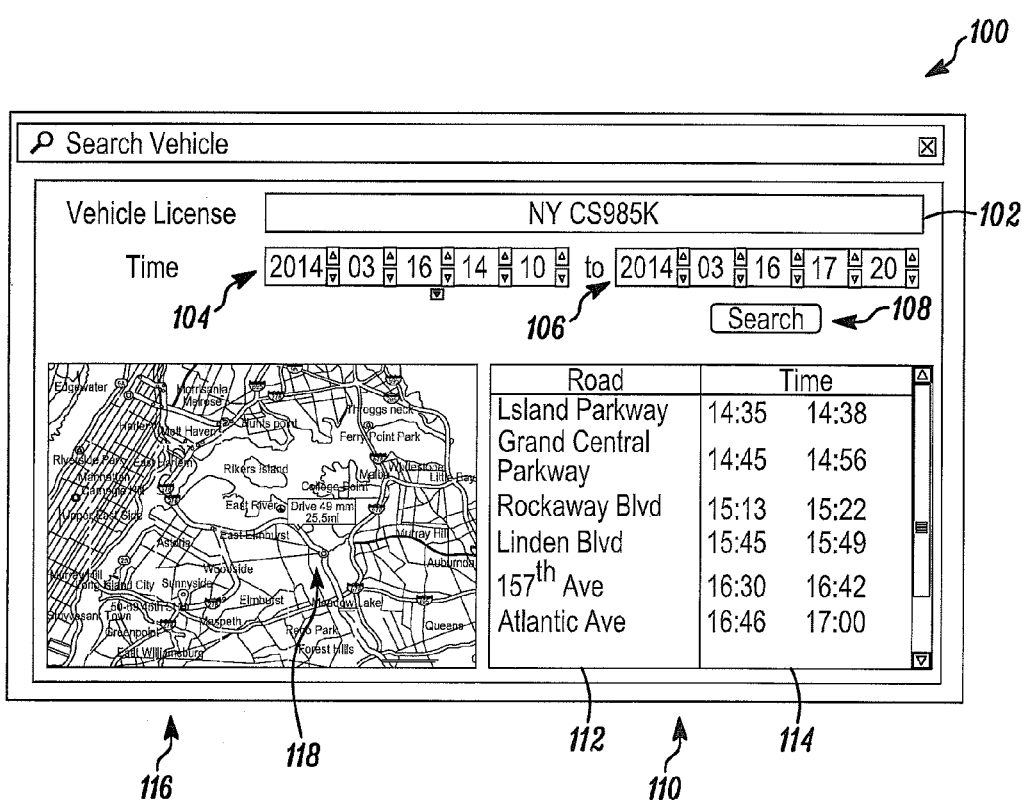
FIG. 2 depicts a user interface that may be used with the system of FIG. 1.

For example, FIG. 2 depicts a GUI 100 for tracking automobiles that may be displayed on the user interface. Included within the GUI is a first interactive window 116 showing a map of the secured area. Another interactive window 102 is provided for entry of a license plate identifier. A third window 104 and fourth window 106 may be provided for entry of start and end times that together define a time period for detection of the license plate. A search button 108 may be activated to cause a search processor or program to search the video files from different cameras (or license plate number list) for incidences of the entered license plate number during the designated time period within the saved video.

The search processor or program may return a list of cameras that include incidences of detection of the license plate. The return list in a return list window 112 may include an identifier of each camera where the license plate was detected within the entered time period. A second window 114 may include a start time (shown on the left) when the license plate was first detected and an end time (shown on the right) when the license plate number was no longer detected.

The return list of cameras may also be depicted on the map of FIG. 2. In this case, a respective marker is shown on the map at the geographic location of the camera.

If the user has difficulty correlating the camera identifier in the window 112, then the user may simply place a cursor over the listing (e.g., "Grand Central Parkway"). In response, a correlation processor may cause the associated marker to begin flashing or to show a balloon with the same address and an arrow connecting the balloon to the marker on the map.

The map may also show markers for every other camera tracked by the system. In this case, the marker of the cameras on the return list may be highlighted to distinguish the markers on the return list.

In addition to displaying markers of cameras that detected the entered license plate, the map may also highlight the route or motion path of the automobile between cameras on the return list. This may be accomplished by correlating cameras on the return list to a path that the automobile could follow (e.g., cameras on opposite ends of the same road). Where the cameras in the return list cannot be correlated to a road or to cameras on opposite ends of the same road, then the motion path may be shown as short path sections extending out from the respective markers on the map based upon a direction, estimated speed, and the duration of detection.

Figure 3:
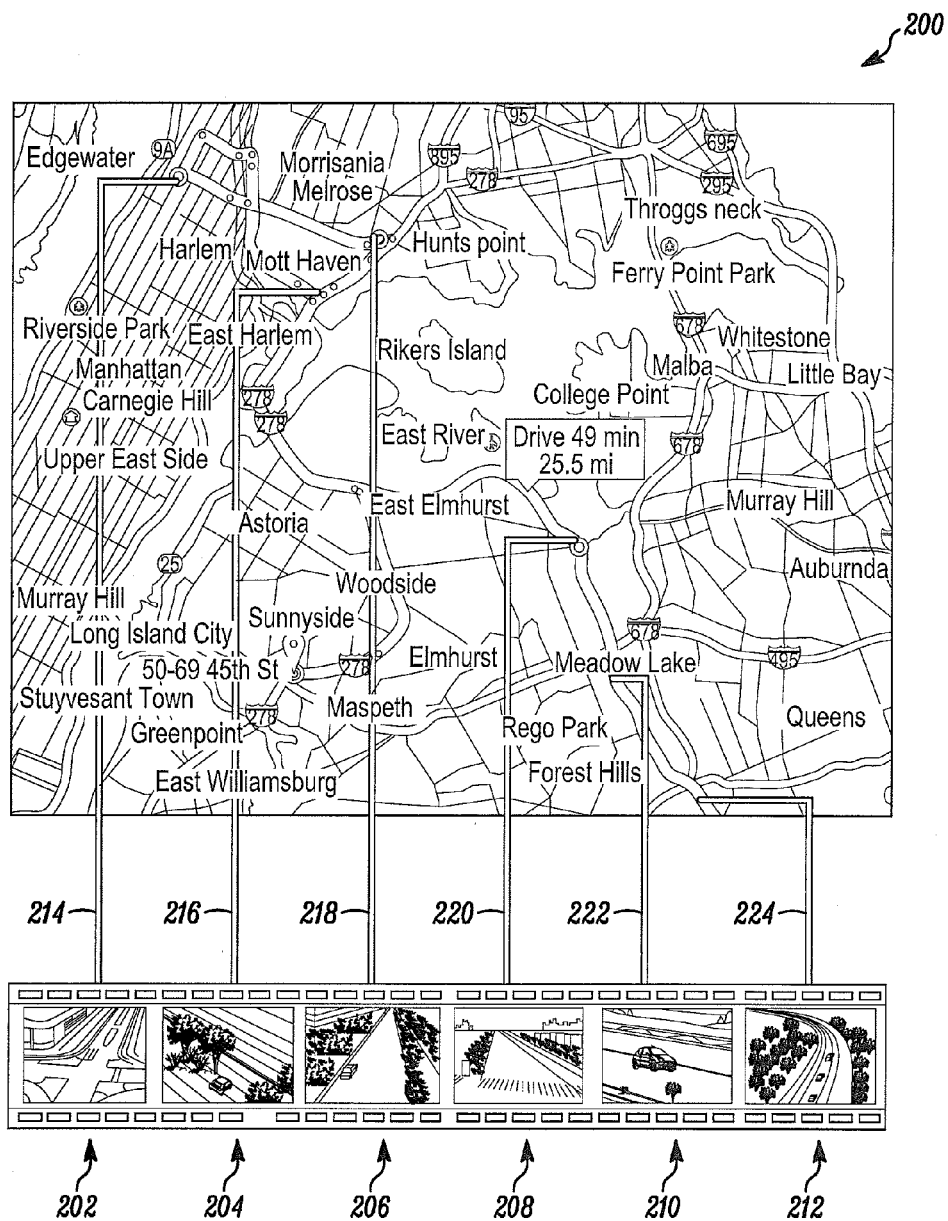
FIG. 3 depicts a first video play back screen that may be accessed through the interface of FIG. 2.

Video from the cameras shown in the return list that are returned by the search processor may be viewed in any of a number of different ways. Under a first scenario, the user may place a cursor over a motion path and click on the motion path. For example, if the user should click on the main motion path of FIG. 2 (i.e., the path identified by the balloon containing the words "Drive 49 min 25.5 mi"), then the display 200 shown in FIG. 3 may be opened and displayed to the user. In FIG. 2, the main motion path included detection of the automobile at six different locations by six different cameras. FIG. 3 shows video from each of the six cameras displayed within a respective viewing window 202, 204, 206, 208, 210, 212. Each viewing window is shown connected to its associated marker via a respective connector line 214, 216, 218, 220, 222, 224.

In the example of FIG. 3, the recorded video from each camera is played simultaneously. This is the case even though the time of recording of each of the six windows is different. In this case, if the user selects a camera of one point on the map and clicks on a highlighted marker of one of the returned cameras, then the system will play back the one video camera of the one point. Stated in another way, clicking on a location or point provides a single channel video playback.

Figure 4:
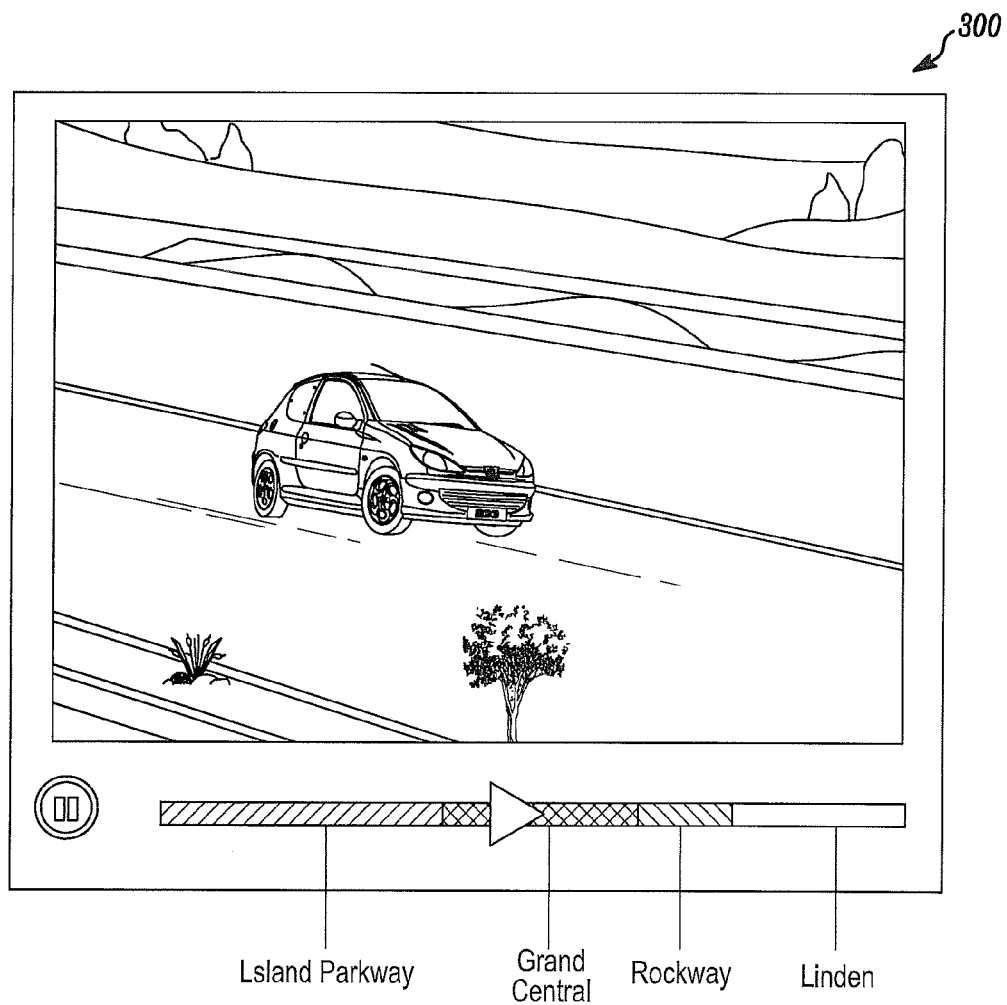
FIG. 4 depicts a second video play back screen that may be accessed through the interface of FIG. 2.

Alternatively, the user may click on a highlighted route of the returned cameras shown on the map. In this case, the video associated with the selected marker is played within a window 300 (FIG. 4) for the benefit of the user. Shown along the bottom of the window is a time line showing an identifier of each camera within that motion path and an arrow indicating the relative temporal position of the displayed video along that motion path.

In general, large scale video surveillance systems (e.g., Intelligent Transportation Systems (ITS) and Safe City (SC) projects, etc.) have the capability to capture license plate numbers of automobiles using Vehicle License Plate Recognition (VLPR) and tracking technology. To search for recorded video of any vehicle in a historic file database, the end user specifies the license number and search time range and all related historic video can be found. Normally, these historic videos are from different devices in different monitored areas. To have a comprehensive view of the information of the vehicle, the end user, in the past, has had to refer to maps and multiple windows to review the video from multiple sources simultaneously. For instance, the end user may review the video on one playback window, then refer back to a map (e.g., an e-map) to identify the location of the next video recording device, and then go back to the playback screen to select the next video file for playback. Sometimes, a user in such cases may need to exert extra effort and incorporate additional technology to synchronize or otherwise make sense of the playback of these historic video sequences. The embodiments described herein overcome these problems by streamlining the process of reviewing video by providing a new search interface based upon an improved philosophy.

Under this improved philosophy, when a user searches for historic video of a desired vehicle, the user may first specify the vehicle license number and search time range, and the computer system will return the vehicle's motion path on an e-map, rather than simply providing a list of unrelated historic video files. On the returned e-map, each recording device has a mark or icon shown on the map depicting the vehicle motion path. The end user can click on this mark or icon to review the saved historic video of the desired vehicle recorded by this camera. If the user clicks on any portion of the whole path, rather than on any specific device mark of a camera, then the system will display video including a complete history of the motion path within the search time range regardless of the recording device. Although technically these videos of the desired vehicle may still be recorded in different devices or files, this embodiment provides a more natural search and display interface to end users in order to review a desired vehicle's movement. In addition, this embodiment is much easier for end users to identify and find vehicle information in the historic video archives because all information can be merged and consolidated into one interface.

Considering the stability and reliability of conventional VLPR processes, this interface can be of great benefit to any vehicle security product and/or project. This is because the philosophy of the interface is based upon the monitored object itself rather than upon the recording device. This process can also be applied to people tracking if Face Recognition can reach similar reliability and stability as VLPR.

The system and interface offers a number of tangible benefits over prior systems. First, the search results are converted from a list of video files (as under the prior art) to a motion path on a geographic map. Second, the play back is changed from a system requiring several interfaces or server windows to a single interface. In addition, search and play back are changed from a device-oriented process to an object-oriented process.

In general, the system and interface operates by providing a database, the database containing map and road information in a monitored area, location information for a plurality of cameras, video clips of the monitored area recorded by each of the plurality of cameras, and a list of automobile license plate numbers, including a location and time of capture of each license plate detected within the plurality of video clips, an input of a computer system receiving a specified license plate number of an automobile and an identifier of a time period, a processor or program of the computer system searching the database for all cameras that captured the specified license plate number in the specified time period and returning a list of cameras, a processor or program of the computer system sorting the returned cameras by time of detection of the specified license plate and drawing a motion path associated with the specified license plate directly on the map based upon the respective returned cameras' location information, a processor or program of the computer system showing a mark of each returned camera on the map, and one of a user input of the computer system detecting a user clicking on a mark identifying a returned camera shown on the map and, in response, a processor or program of the computer system playing a recorded video file of the identified returned camera showing the automobile during the specified time period, and a user input of the computer system detecting a user clicking directly on the motion path and, in response, if the user chooses one point marked on the path, a processor or program of the computer system playing one recorded video of the camera at the point during the specified time period. If the user chooses the path, a processor or program of the computer system operates by merging and playing recorded video of the automobile recorded by the returned cameras during the specified time period.

Alternatively, the system and interface includes a plurality of video recordings in a database containing images of vehicles traveling within a predetermined geographic area and a list of license plates attached to each of those vehicles, a display that depicts a map of the geographic area, an input that receives an identifier of a license plate of a vehicle and a time period, and a processor that searches the plurality of video recordings for the license plate, returns a list of cameras capturing images of the identified license plate, sorts the returned list by time of capture, and displays a motion path of the vehicle on the map for the time period based upon the returned list.

Alternatively, the system and interface includes a plurality of video recordings in a database containing images of vehicles traveling within a geographic area, a display that depicts a map of the geographic area, an input that receives an identifier of a license plate of a vehicle and a time period, a processor that searches the plurality of video recordings for the license plate and detects the license plate within at least some of the plurality of video recordings within the time period, a processor that returns a list of cameras where each camera on the list is associated with a video recording of the at least some of the plurality of video recordings and presents the list on the display, and a processor that displays a motion path of the vehicle on the map based upon the returned list.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results.

Other steps may be provided, or steps may be eliminated, from the described flows, and other components may be added to, or removed from the described embodiments.

The invention claimed is:

1. A method comprising:
   providing a database, the database containing map and road information in a monitored area, location information for a plurality of cameras, a plurality of video clips of the monitored area recorded by each of the plurality of cameras, and a list of automobile license plate numbers including a location and time of capture of each license plate detected within the plurality of video clips;
   a user input of a computer system receiving a specified license plate number of an automobile and an identifier of a specified time period;
   a processor of the computer system searching the database for all cameras in the plurality of cameras that captured the specified license plate number in the specified time period and returning a list of cameras;
   the processor of the computer system sorting the returned list of cameras by time of detection of the specified license plate number and drawing a motion path associated with the specified license plate number directly on a map based upon the location information for a respective returned camera on the returned list;
   the processor of the computer system showing a mark of each returned camera on the returned list on the map; and
   one of the user input of the computer system detecting a user clicking on the mark identifying the respective returned camera shown on the map and, in response, the processor of the computer system playing a recorded video file of the identified respective returned camera showing the automobile during the specified time period and the user input of the computer system detecting the user clicking directly on the motion path and, in response, the processor of the computer system merging and playing recorded video of the automobile recorded by each returned camera on the returned list during the specified time period.

2. The method of claim 1 further comprising a surveillance system recording video from a plurality of locations, identifying vehicles within frames of the recorded video, and recognizing license plate numbers on the identified vehicles.

3. An apparatus comprising:
   a database storing a plurality of video recordings containing images of vehicles traveling within a predetermined geographic area and a list of license plates attached to the vehicles;
   a display that depicts a map of the geographic area;
   an interface that receives an identifier of a specified license plate of a specified vehicle and a time period;
   a processor that searches the plurality of video recordings for the specified license plate, returns a list of cameras capturing images of the specified license plate, sorts the returned list by time of capture, and displays a motion path of the specified vehicle on the map for the time period based upon the returned list;
   an interface that monitors the map and detects selection of the motion path; and
   a processor that simultaneously plays video from each camera in the returned list that recorded the specified license plate during the time period in response to the selection of the motion path,
   wherein the map further comprises a plurality of icons shown on the map, wherein each of the plurality of icons shown on the map corresponds to a camera that recorded a corresponding one of the plurality of video recordings, and wherein the motion path on the map further comprises a highlighted line on the map connecting two cameras that recorded the specified license plate.

4. The apparatus as in claim 3 further comprising the interface that monitors the map and detects selection of one of the plurality of icons.

5. The apparatus as in claim 4 further comprising the processor that detects the selection of the one of the plurality of icons and plays a video sequence associated with the specified license plate recorded by the corresponding camera.

6. An apparatus comprising:
a database storing a plurality of video recordings containing images of vehicles traveling within a geographic area and identifiers of respective license plates attached to the vehicles;
a display that depicts a map of the geographic area;
an interface that receives an identifier of a specified license plate of a specified vehicle and a time period;
a processor that searches the plurality of video recordings for the specified license plate and detects the specified license plate within at least some of the plurality of video recordings within the time period;
the processor that returns a list of cameras, wherein each camera on the list is associated with a video recording of the at least some of the plurality of video recordings, and presents the list on the display;
the processor that displays a motion path of the specified vehicle on the map based upon the list, including a highlighted line on the map connecting a location of at least two cameras on the list that recorded the specified license plate;
the interface that monitors the map and detects selection of the motion path; and
the processor that simultaneously plays the video recording from each camera on the list that recorded the specified license plate during the time period in response to the selection of the motion path.

7. The apparatus as in claim 6 further comprising a surveillance system.

8. The apparatus as in claim 7 wherein the display further comprises a guard station that displays real time video from a plurality of cameras.

9. The apparatus as in claim 6 further comprising a plurality of cameras located with the geographic area.

10. The system as in claim 9 further comprising a plurality of icons displayed on the map, wherein each of the plurality of icons corresponds to a camera of the list, and wherein each of the plurality of icons is displayed at a corresponding geographic location on the map.

11. The apparatus as in claim 10 further comprising a plurality of roads displayed on the map, wherein each of the plurality of icons is displayed along one of the plurality of roads.

12. The apparatus as in claim 11 wherein the motion path further comprises a highlighted portion of one of the plurality of roads.

13. The apparatus as in claim 12 further comprising the interface that monitors the map and detects selection of one of the plurality of icons.

14. The apparatus as in claim 13 further comprising the processor that detects the selection of the one of the plurality of icons and plays a video sequence associated with the specified license plate recorded by the camera of the list corresponding to the one of the plurality of icons.

* * * * *